G. Sanford.

Hackling Machine.

Nº 84,070. Patented Nov. 17, 1868.

Witnesses:
Wm A Morgan
G C Cotton

Inventor:
G Sandford
per Munn & Co
Attorneys

United States Patent Office.

GELSTON SANFORD, OF BERGEN POINT, NEW JERSEY, ASSIGNOR TO THE MALLORY AND SANFORD FLAX AND HEMP MACHINE-DRESSING COMPANY, OF NEW YORK CITY.

Letters Patent No. 84,070, dated November 17, 1868.

IMPROVEMENT IN MACHINE FOR SEPARATING THE PULP FROM FIBROUS SUBSTANCES.

The Schedule referred to in these Letters Patent and making part of the same.

*To all whom it may concern:*

Be it known that I, GELSTON SANFORD, of Bergen Point, in the county of Hudson, and State of New Jersey, have invented a new and improved Machine for Separating the Pulpy Matter from Fibre-Producing Leaves; and I do hereby declare that the following is a full, clear, and exact description thereof, which will enable those skilled in the art to make and use the same, reference being had to the accompanying drawings, forming part of this specification.

The nature of this invention relates to improvements in machinery for separating the pulpy matter from fibre of the leaves of the *Agave Sisilana*, and other tropical fibre-producing plants, from which the Sisal hemp of commerce is obtained.

It consists of a wheel, arranged to rotate in a vertical plane, which is provided with combs and scrapers, arranged upon its sides radially, and operating between vertically-suspended holders, for the material to be operated on, which is previously crushed between rollers, the said holders being for pressing them against the combs or scrapers, as the thickness of the mass being combed varies.

Provision is also made for supplying water to the mass as the combs and scrapers are acting upon it.

Figure 1:
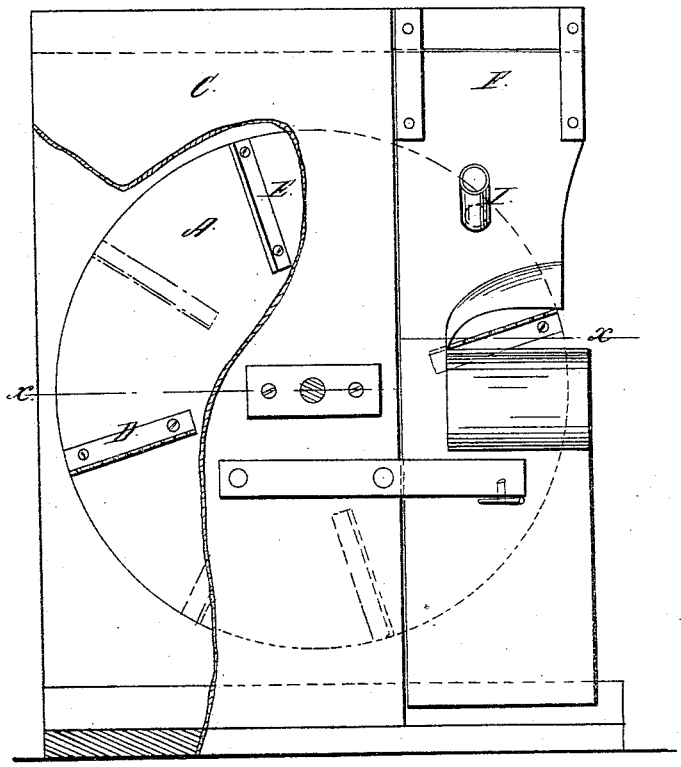
Figure 2:
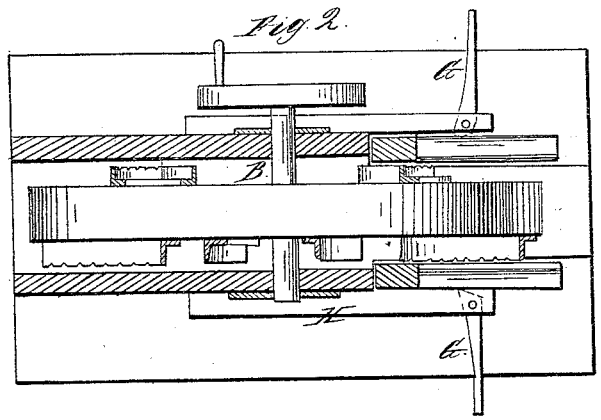

Figure 1 represents a side elevation of my improved machine, with a part broken away, and Figure 2 represents a horizontal section on the line $x\ x$ of fig. 1.

Similar letters of reference indicate corresponding parts.

A represents a disk, of wood or other suitable material, arranged upon a horizontal axis, B, in a suitable casing, C, and provided with a hand-crank, or other means of giving it rotary motion.

The said disk is provided, on each side, with radial combs or scrapers.

F represents holders, preferably constructed of planks of wood, and suspended from the top portion of the casing in such a manner that they will swing away from contact with the combs when in their normal condition.

They are provided with openings above the horizontal plane of the axis, communicating with the wheel, the lower walls of which serve as the holders or supports, over which the operator presents the leaves, which have been previously passed through squeezing-rollers, for crushing the pulpy matter, to the action of the combs and scrapers.

G represents levers, pivoted to the side rails H, and provided with eccentric or cam-shaped ends, bearing against the sides of the holding-planks, and suitably arranged to pass them up to the combs.

In operation, the leaves, after having been suitably broken by squeezing-rollers or other similar means, are taken hold of, at the stem, by the operator, and suspended across the holding-planks, between the latter and the combs, when, by one hand, he can, if the machine is not operated by power, turn the crank, and with the knee, acting against the lever G on that side, press the holder up towards the combs, whereby the pulpy matter will be separated from the fibre, as will be readily understood.

Many of the leaves from which the fibre is obtained vary considerably in thickness. They are also of considerable length. Hence the necessity of such provision as I have described for moving the holder to and from the combs or scrapers.

By reason of the arrangement of the holder so that the leaves are presented above the centre of the combing-wheel, a better action is secured, as it is operated on more nearly in a vertical position, and the lower ends of the leaves are always maintained against the holding-plank.

The opening in the holding-planks, being arranged above the horizontal plane of the axis of the wheel A, admits of adjusting the position of the leaves to or from the axis, to cause the combs to act on the whole or a part of the fibre, as, when it is at the greatest distance from the axis, but a small portion of the leaf will be acted upon, and the whole amount when it is at the innermost position.

This feature is important, as the leaves are thicker at one end than the other, and it is desirable not to allow the combs to act on the thin portion too much during all the time required to reduce the thicker portion, as the fibre of the inner portion would be unnecessarily worn away.

If the said openings are on the horizontal line of the axis, the lower portion of the leaves would be carried around with the combs.

I have provided combs and holding-plates on both sides of the wheel, whereby one machine serves to accomplish a double amount of work, two attendants being employed to supply the leaves, one at each side.

Another important feature of this double arrangement is that, in practice, I have found that a better effect is produced to provide one side with coarser combs, and subject the leaves to their action, for separating the mass of the refuse matter first, and then to subject the partially-dressed leaves to the action of finer combs on the other side, in which case a bunch of them may be taken together, and finished in about the same time required to finish one leaf separately.

I represents water-spouts, for supplying a current of water to the combs and the leaves while the operation is being carried out, whereby the operation is greatly facilitated.

Having thus described my invention,

What I claim as new, and desire to secure by Letters Patent, is—

1. The holding-planks F, suspended vertically upon each side of the rotary scraper-disk, when the feed-openings therein are arranged above the horizontal plane of the axis of said disk, as herein described, for the purpose specified.

2. The vertical holding-planks F, suspended above the disk A, free from contact with the combs E, and adapted to be operated by the cam-levers G, to press the material to be operated upon against the radial combs from opposite sides, as herein shown and described.

3. The described arrangement of the rotating disk A, the radial combs E, upon opposite sides of said disk, the suspended planks F, having the feed-openings and the spouts I, the side rails H, and cam-levers G, all operating as described, for the purpose specified.

GELSTON SANFORD.

Witnesses:
FRANK BLOCKLEY,
ALEX. F. ROBERTS.